Patented May 4, 1937

2,078,951

UNITED STATES PATENT OFFICE 2,078,951

REGENERATIVE CONTACT MASS

Eugene J. Houdry, Rosemont, Pa., assignor to Houdry Process Corporation, Dover, Del., a corporation of Delaware No Drawing. Application August 7, 1935, Serial No. 35,101

5 Claims. (Cl. 196—52)

This invention relates to contact masses used alternately in transformation and in regeneration. More specifically, it is concerned with contact masses which promote, enter into, or in any way assist in the transformation or treatment of materials, including hydrocarbons and their derivatives, whether of coal, petroleum, shale or other origin, which produce sulphurous, carbonaceous, or other burnable deposits. It is particularly directed toward improvements in the regenerative properties of such masses.

It is well known that contact masses which acquire a deposit of contaminants as a result of a reaction exhibit a more or less gradual loss of activity as the "on-stream" period progresses and that the "off-stream" or regenerating period is determined to a large extent by the amount of the contaminating deposit. Since the regenerating period represents a total loss so far as the production of the desired transformed material is concerned, it is important that the period be kept as short as possible and that the deposit be removed as completely as possible. Carbonaceous and sulphurous deposits are most quickly removed by combustion, and to facilitate the burning operation the contact mass should be made up of bits or fragments, and may be formed in molded pieces after the manner disclosed in my copending application Serial No. 600,581, filed March 23, 1932, renewed July 3, 1936. When the contact mass is very porous, as of silicious material such as described in my aforesaid copending application, the deposit extends all through the individual pieces making up the mass and burning of the deposit within the pieces requires a sustained temperature. Otherwise, the reaction may cease before the regeneration is complete within the whole mass. The temperatures of regeneration by oxidation are normally higher than those of transformation but transition from the latter to the former is easy once burning has started since the reaction is exothermic. If the "on-stream" and "off-stream" temperatures are far apart, as of the order of 200° F. or more, difficulties and loss of time are involved in bringing the mass down from the high regenerating temperature to the relatively lower reaction temperature, since the transition must be effected uniformly throughout the depth and cross section of the mass.

One object of the present invention is to accelerate the regeneration of contact masses. Another object is to lower the regeneration temperature of contact masses. Still another object is to effect more complete regenerations. Other objects will be apparent from the detailed discussion which follows.

I have made an intensive and extensive study over a period of several years of catalytically active, semi-active and substantially catalytically inert contact masses, including silicious masses such as silica gel, blends of silica and alumina, whether of natural origin or artificially prepared, pumice, kieselguhr, fire clays, and the like. My studies have been directed in part toward adapting such masses to use in commercially operative cycles of alternate periods of transformation and regeneration by oxidation or combustion of burnable deposits made therein during the transformation. A feasible regeneration procedure consists in feeding to a contaminated mass a stream of combustion supporting or oxygen bearing fluid, such as air or a mixture of air and gaseous diluent, until the regeneration fumes contain a predetermined amount of carbon dioxide, as about 1 to 4%, for example. After combustion of the deposits has started, the temperature of the mass is regulated to and held at a predetermined level until the rate of combustion becomes too low to hold the mass at that level. When the regeneration is completed the temperature of the mass is adjusted to that suitable for the desired reaction, substantially as disclosed in certain copending applications, including my application Serial No. 604,997, filed April 13, 1932. Heretofore with feed rates of regenerating medium and other operating conditions commensurate with reasonably fast regenerations, it has been necessary for silicious contact masses to attain and maintain temperatures of 1050° F. or higher to effect a reasonably good regeneration, and even then a residual deposit of burnable material approximating 1% by weight of the mass would still remain from an original deposit of 4 or 5% accumulated during a previous transforming reaction.

Many of the catalysts heretofore used by me had a penetration depth of substantially 2 mm. and took the form of macaroni, plugs or broken pieces, as disclosed in my aforesaid copending application, Serial No. 600,581, and required the aforementioned regenerating temperature above 1000° F., preferably at least 1050° F. With adsorptive and highly heat-sensitive masses such as those made up of certain silicious material, especially catalytically active blends of silica and alumina, it is usually injurious to go above 1100° F., and, even with a mass maintained at an average temperature of 1050° F., there seems to be a small initial loss of activity and a tendency for further depreciation after the catalyst has been used for a considerable period with frequent regenerations by oxidation.

Numerous experiments have been made by me upon the size of catalyst as affecting the period and extent of regeneration. The use of catalysts in very finely divided or powdered form is unsatisfactory due to their resistance to penetration of reactants and essentially insuperable difficulties of regeneration. Moreover, there are certain limitations in the direction of size which are set by the equipment required for their use, as, for example, by the size of openings in grids when the latter are used to support the contact mass, or by the size of openings in conduits when the latter are embedded in the mass for distribution of reactants or removal of products. In practice, I have found it advantageous to reduce the size of the individual pieces of the contact mass to 1 mm. penetration depth by molding the same in plugs of 2×2 mm. size, or by crushing molded pieces of larger size and segregating the pieces according to size. Useful sizes are within 6 to 20 mesh (1.5 to .5 mm. penetration depth) with a preference for 8 to 10 mesh (approximately 1 mm. penetration depth).

Interesting results were noted when comparisons of catalyst units of the sizes just indicated were made with previously used units of larger size (as of 2 mm. penetration depth). Starting with catalysts of both sizes having the same deposit of carbonaceous material thereon (as 4% by weight of the mass), with the small sized catalyst of 1 mm. penetration depth either in plug form or 8 to 10 mesh fragments, the speed of regeneration was approximately 40% faster than with catalyst units of double this penetration depth. At normal regeneration temperatures (1050° F. and higher) with a two hour regenerating period, the carbon deposit in the larger units can be reduced to about .7%; with the smaller size units, substantially the same result is secured but in much less time. The faster regeneration of the smaller units is probably due to the more favorable surface to volume ratios of individual pieces presenting decreased penetration depth thus permitting better rates of diffusion of fluids into and through the units.

Attempts to regenerate the larger catalyst (2 mm. penetration depth) at a lower temperature, as at 1000° F. or below, so as to minimize the danger of impairing the catalyst by overheating, were not very successful. The burning of the carbonaceous deposit at such temperatures is neither uniform nor sustained. Starting with a 4 to 5% carbon deposit, there remained 1.8% on the catalyst after regeneration. When this lower temperature regeneration was tried with a smaller sized catalyst (1 mm. penetration depth) the carbon deposit which was left was reduced but was still too high, namely, 1.4%, as compared with the 1.8% for the larger size of catalyst.

Suitable material was then sought to serve as an oxidation promoter in speeding up and in completing the regenerating reaction. Metals or metallic compounds of nickel, copper, cobalt, chromium, iron, and manganese were found to promote combustion of burnable deposits. When used with contact masses consisting wholly or largely of silicious material, only a relatively small quantity of the promoter is required to improve the regeneration. In many instances, this quantity need not be more than 1%, never over 5%, and sometimes even less than 1%. The promoter may be incorporated in the contact mass in known ways, as by moistening or soaking the mass with a liquid solution of the metal, such as the metallic nitrate, sulphate, chloride, etc., or other metallic compound; or the catalytic material may be mixed with the metal or metallic compound in finely divided form and in a dry state before molding or otherwise forming the same in bits, pieces or fragments, after the manner disclosed in my aforesaid copending application Serial No. 600,581. In the latter application, the purpose was to produce active silicious contact masses combined with active metals or metallic compounds for effecting desirable transformations or conversions of starting materials including hydrocarbons, and to develop contact masses characterized by minimum loss of activity in spite of frequent regenerations. Metals or metallic compounds were combined with a silicious base only when necessary or helpful in securing the transformation of the charging material. Even then, with such extremely heat sensitive material, there was, at times, an initial reduction of activity of a few percent during the first two or three regenerations at the temperatures then considered necessary to effect a good operation (1050° F. and over), whereupon the mass would stabilize at a constant level of activity and maintain it for a considerable period (as a year) before there appeared to be a further but very gradual impairment.

If the catalytic material is already in finished form, as in lumps, fragments or molded pieces, the oxidation promoter will be incorporated therein by the liquid solution method referred to in the preceding paragraph. The preferred method, however, is to incorporate it during the manufacture of the catalyst by the dry powder method. This, as also indicated in the preceding paragraph, consists in thoroughly mixing together while in a dry state and in finely divided form all of the ingredients of the catalyst. The mixture is then moistened with a suitable liquid which will assist in the molding operation, such as water, oil, etc., to act as a lubricant or otherwise in compacting the material in a tableting, auger or other machine for reducing the material to solid units of uniform size. The units are subsequently dried to drive out the moistening material and then hardened for a suitable period, as several hours, at a suitable temperature, which may be of the order of 1000° F. for silicious material, to produce the finished catalyst.

By incorporating with the mass the requisite small quantity of promoter, and by effecting the regeneration in the lower range of 900 to 1000° F., it has been possible to avoid even the initial loss of activity of the mass and to equal the results, as to the extent of carbon removal obtained previously at the higher regeneration temperatures, namely, to reduce the carbon residue to about 0.75%. In some instances, the catalyst promotes a better reaction after a few regenerations than when first used. Where the combination of silicious base and metallic material capable of promoting oxidation is already known because of its desirable transforming effects, as the combination of activated hydrosilicate of alumina with 2% nickel for refining and stabilizing light hydrocarbons in the gasoline boiling range, as disclosed, for example, in my copending application Serial No. 610,567, filed May 11, 1932, it is only necessary, in order to practice the present invention, to supply the oxidizing or regenerating medium to the mass at reaction temperatures and to hold the reaction temperatures at 1000° F. or somewhat below.

However, for other reactions, as in the catalytic transformation of higher boiling hydrocarbon distillates and residues into lighter hydrocarbons in the gasoline boiling range, the addition to or incorporation in an active silicious contact mass of metals or metallic compounds to improve the regenerating cycle has, as a rule, an adverse effect upon the transforming operation (as to yield) or upon the quality of the products (antiknock and gum forming properties of gasoline, amount and kind of fixed gas, etc.). This is extremely pronounced in the cases of nickel, copper and cobalt, for example, where amounts as small as .1% to .05% of these metals on the catalyst destroy the transforming reaction from a practical point of view by producing excessive amounts of gas and an unduly large carbon deposit. By extensive experiments, I have found that manganese has by far the least adverse effect upon the transformation of hydrocarbons to produce gasoline. In fact, there is no reduction in yield, rather sometimes an improvement, and only a slight reduction in the octane rating of the gasoline, as of the order of a point or less. Hence I consider manganese as the best regeneration promoter known to me at this time. Extensive studies indicate that amounts as small as .5% of manganese, deposited on the catalyst by a manganese nitrate solution or mixed with the contact material in dry state, as manganese dioxide, before molding, give desirable results. 1% manganese is the preferred amount in most cases, but other amounts up to 5% can be used before the effect upon the transforming reaction becomes too objectionable.

By combining the features of critical size of catalyst (1 mm. penetration depth as in plugs of 2 mm. diameter or crushed to 8 to 10 mesh) with an oxidation promoter in very small amount, as of the order of 1% and preferably manganese, the above described advantages are made cumulative, producing an outstanding result in low temperature regenerations within the range of 900 to 1000° F. and with a reduced carbon residue, namely, .4 to .5%, as compared with .7% which is normal for the higher temperature regeneration. The result is also much superior to the .75% residue with the old or larger catalyst using the oxidation promoter and regenerated in the low temperature range. With this critically sized and oxidation promoted mass in a low temperature regeneration, there is no impairment of the catalyst at any time, so far as I can discover, and no change in yield, and the variation in the quality of the product is so small as to be negligible.

The faster burning of contaminants induced by the making of the catalytic units of suitable penetration depth and by incorporating an oxidation promoter therewith permits a more efficient use of heat extracting means including those in which a cooling liquid is sent in heat exchange relation in a plurality of streams through the interior of the contact mass by means of pipes or other suitable forms and arrangements of conduits extending within or through the mass to remove heat from all parts of the mass as disclosed for example in the copending application of myself and R. C. Lassiat, Serial No. 728,544, filed June 1, 1934, or in my copending applications Serial No. 6291, filed February 13, 1935 and Serial No. 12,564, filed March 23, 1935. Previously, it was necessary to start the burning and allow the temperature to rise above 1000° F. before the cooling medium could be utilized. With a catalyst of the present invention, the cooling medium can be introduced into the mass at the same time that the oxidizing medium is sent in, so that the extraction of heat begins with the burning of contaminants and the burning can proceed at a much faster rate with heat removed practically as fast as it is made from the very beginning of the oxidizing reaction. Thus complete regenerations can be made in 45 minutes or less which previously required upwards of two hours, depending of course upon the quantity of the burnable deposit. By utilizing the cooling medium at once, a loss of time at the beginning of the reaction to bring the contact mass to proper burning temperature is avoided and there is also a distinct saving at the end of the regenerating period since the regenerating temperature is now from 50 to 100° F. or more lower than heretofore required. For example, an excellent catalyst for performing a catalytic cracking reaction on higher boiling hydrocarbons to produce lighter hydrocarbons in the gasoline boiling range at reaction temperatures of 810° to 850° F. comprises a blend of silica and alumina in the weight ratio of 3½:1 or 4:1 with a content of less than 10% of the oxides of magnesium, calcium and iron produced by acid or other chemical treatment of a suitable clay base and molded, dried and hardened in 2×2 mm. plug size or made in larger size and then broken up to segregate the 8 to 10 mesh broken fragments. A small percentage of an oxidation promoter, as .5 to 1.5% manganese, is incorporated in the catalyst by either of the hereinbefore described methods. After such a contact mass has accumulated about 4% by weight of burnable deposits as a result of the transforming reaction, it is regenerated in place in a converter such as disclosed in any of the last named copending applications with a circulated cooling medium, the reaction taking place in the range of 900° to 1000° F. This is on the average only 100 to 150° F. above the reaction temperature, so that it is necessary to continue the circulation of the cooling medium for but a few minutes at the end of the regenerating period to bring the entire mass down to reaction temperature.

Semi-active or substantially inert masses such as pumice, fire clays or blends of silica and alumina which have little or no original activity or which have been subjected to heat or other treatment to lower their original activity, including, for example, the inactive silicious contact material or carrier disclosed in Patent No. 1,818,403, issued August 11, 1931 to Alfred Joseph, are not so susceptible to impairment of efficiency by contaminating deposits or by regenerations at high temperatures as the more active contact masses. They are capable of efficient use as spreading materials and in aiding mildly catalytic reactions such as viscosity breaking. However, it has been very difficult to secure a good regeneration of such masses because combustion will not start or be maintained properly when the temperature is below 1000° F., even when the mass is made into units of substantially 1 mm. penetration depth. By depositing about 1% manganese in such material, there has been no adverse effect upon the viscosity breaking operation and highly successful elimination of deposits by burning has been accomplished in the temperature range of 800° to 1000° F.

The herein disclosed features for improving regenerative contact masses are applicable to the transformation, conversion or other treatment of all materials which produce burnable deposits on the contact mass, including not only hydrocarbons such as mineral oil from coal, petroleum, shale or other origin, to which reference has been made for illustrative examples, but also including the treatment of resinous materials to produce resin oil, the esterification of alcohols and organic acids, the oxidation and resinification of organic materials, the dehydration of fatty acids, and similar reactions. It is to be understood further that while the improved contact masses and regenerative procedure are intended for regenerations to be effected without removing the contact mass from the reaction chamber, they are equally applicable when it is preferable to first remove the mass to a separate and distinct chamber.

I claim as my invention:

1. In the treatment or transformation of hydrocarbons and their derivatives by the use of adsorptive silicious contact masses disposed in individual pieces of controlled size and operating alternately on stream and in regeneration, the process steps for improving the operative cycle with minimum impairment of desired characteristics in the products obtained including anti-knock rating which steps comprise incorporating in the contact mass for the purpose of promoting regeneration by oxidation a very small amount, .5 to 1.5%, of manganese or a manganese compound, effecting during regenerating periods a rapid reduction of the contaminating deposit to less than one-half of one percent by weight of the mass by feeding thereto an oxygen containing gas to burn away such deposit, and holding the mass at a temperature not in excess of 1000° F. during and throughout each regenerating period.

2. In the treatment or transformation of hydrocarbons and their derivatives by the use of adsorptive contact masses involving blends of silica and alumina in controlled ratio and disposed in individual pieces for operation alternately on stream and in regeneration, the process of improving the operative cycle which comprises incorporating in the contact mass about 1% by weight of manganese or manganese compound of the type formed therefrom during the on-stream or regeneration periods for the particular purpose of promoting regeneration and of avoiding or keeping to a minimum adverse effects on the yield and quality of products, and thereupon effecting both the transforming and the regenerating reactions entirely within the temperature range of 750 to 1000° F.

3. In the treatment or transformation of hydrocarbons and their derivatives by the use of adsorptive contact masses involving blends of silica and alumina in controlled ratio and disposed in individual pieces for operation alternately on stream and in regeneration, the process of improving the operative cycle which comprises incorporating in the contact mass about 1% by weight of the mass of manganese to permit rapid and complete regeneration of the mass, and thereafter subjecting the hydrocarbon charge in heated condition to the action of the contact mass at a temperature below 850° F. to effect a transforming reaction on the same, and then regenerating the mass by sending thereto a stream of oxygen bearing fluid to effect substantially complete removal of contaminating deposits while restricting the temperature of combustion to not more than 150° F. above the temperature of the transforming reaction.

4. A porous contact mass or unit for the catalytic treatment or transformation of hydrocarbons during which it acquires a combustible deposit and capable of being freed of such deposit by a rapid regeneration by oxidation at temperatures below 1000° F., the mass comprising a blend of silica and alumina and having incorporated therein as an oxidation promoter manganese in such restricted amount as to have substantially no adverse effect upon the treating or transforming reaction as to yield or quality of products including anti-knock rating of motor fuels so produced, the restricted amount of manganese being of the order of .5 to 1.5% by weight of the mass.

5. A porous contact mass for the catalytic treatment or transformation of hydrocarbons to produce motor fuels and adapted to be quickly freed at temperatures below 1000° F. of carbonaceous and other contaminating deposits resulting from the treating or transforming operations, the mass being made up of molded units of controlled size comprising essentially a blend of silica and alumina in the range of weight ratio of 3½:1 to 4:1 and having incorporated therein as an oxidation promoter which speeds up the regeneration but has little or no adverse effect upon the yield or quality of products obtained manganese or a manganese compound to the extent of about 1% by weight of the mass.

EUGENE J. HOUDRY.